Jan. 11, 1927.
G. SCHWORETZKY
1,613,962
METHOD OF TESTING PRESSURE STORAGE VESSELS
Filed Nov. 9, 1921
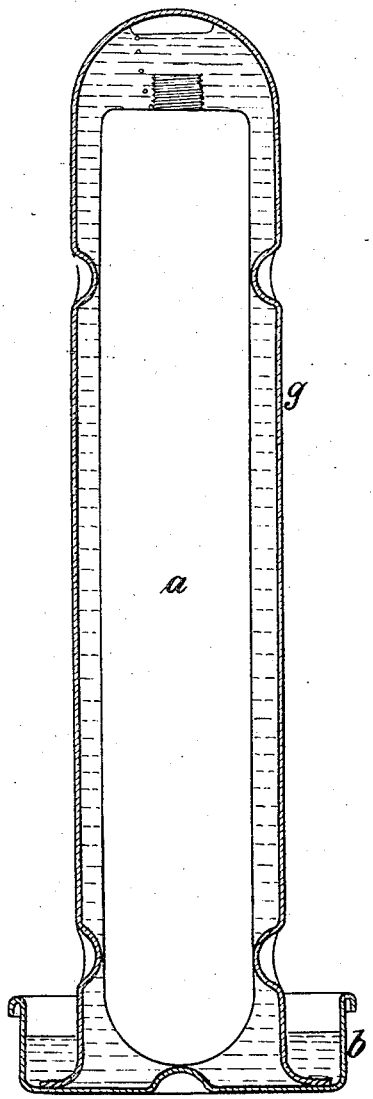

Patented Jan. 11, 1927.

1,613,962

UNITED STATES PATENT OFFICE.

GUSTAV SCHWORETZKY, OF ESSLINGEN-ON-THE-NECKAR, GERMANY.

METHOD OF TESTING PRESSURE STORAGE VESSELS.

Application filed November 9, 1921, Serial No. 514,095, and in Germany November 11, 1920.

The invention relates to an improved method for testing pressure storage vessels or containers of any construction with regard to tightness. It has been proposed heretofore in testing vessels for tightness to submerge them in water and to fill them with air pressure, any bubbles arising indicating a faulty vessel. Such a method will not suffice for testing pressure storage vessels, since these must be without the slightest flaw in order to be able to preserve their contents perfectly for long periods of time. It is therefore necessary to subject these vessels to a test whereby the slightest leak will be detected. To this end the present invention contemplates the use of the submerging method, with the modification that the vessel is placed under a transparent bell which is completely filled with liquid. In this manner air escaping from the vessel, which might be in such minute quantities as to be practically invisible in the previously known testing methods, is trapped beneath the dome of the vessel and gives visible evidence of any flaw, however small, in the vessel. Preferably the testing of the containers is carried out by the aid of a hot liquid, because the time necessary for the test is then considerably reduced owing to the increase of the internal pressure in the container and at the same time the liquid loses the capacity to absorb gases, in particular carbonic acid.

In the accompanying drawing an apparatus suitable for carrying out the improved method is shown in longitudinal section. On referring to it, it will be seen that the vertically disposed pressure storage vessel or container $a$ is covered by a bell $g$, made of glass and filled with water. The bell is sealed at its lower end by dipping into a dish or tray $b$ containing water. The heating of the container $a$ and the liquid in the bell and the tray may be effected in any suitable manner. At the dome of the bell $g$ is indicated how in course of time owing to the production of a liquid level even the finest gas bubbles rising from the pressure storage vessel become visible.

It will be understood that the apparatus for carrying out the improved method is only shown by way of example and could be modified in many ways.

What I claim and desire to secure by United States Letters Patent is:

1. The method of testing pressure storage vessels for detecting flaws therein, consisting in submerging the closed vessel in a liquid for an indefinite period and trapping any gas bubbles escaping therefrom.

2. The method of testing pressure storage vessels for detecting flaws therein, consisting in submerging the closed vessel in a liquid for an indefinite period and trapping in a transparent bell any gas bubbles escaping therefrom.

3. The method of testing pressure storage vessels for detecting flaws therein, consisting in submerging the closed vessel in a heated liquid for an indefinite period and trapping in a transparent bell any gas bubbles escaping therefrom.

In testimony whereof I affix my signature.

GUSTAV SCHWORETZKY.